LIMITING AMPLIFIER EMPLOYING NON-SATURATING TRANSISTORS FOR PROVIDING IN-PHASE SQUARE WAVE OUTPUT FROM DISTORTED WAVE INPUT

Filed March 9, 1959

INVENTOR
ALFRED BRUNSCHWEIGER

BY

Arthur S. Tenser

ATTORNEY

United States Patent Office 3,078,377

Patented Feb. 19, 1963

3,078,377

LIMITING AMPLIFIER EMPLOYING NON-SATURATING TRANSISTORS FOR PROVIDING IN-PHASE SQUARE WAVE OUTPUT FROM DISTORTED WAVE INPUT

Alfred Brunschweiger, Poughkeepsie, N.Y., assignor to International Business Machines Corporation, New York, N.Y., a corporation of New York Filed Mar. 9, 1959, Ser. No. 798,224
4 Claims. (Cl. 307—88.5)

This invention relates to amplifiers and more particularly to amplifiers exhibiting a limiting action at a predetermined level of signal amplitude.

It frequently becomes necessary to reconstruct, or amplify and reshape, a train of pulses that have become rounded and distorted by the equipment through which they are transmitted. Since some characteristic of the pulses, such as spacing, or duration, generally carries the intelligence, it is necessary that the amplifying and reshaping process does not introduce phase shift or phase distortion. Thus, the points of crossing of the reference level by the output pulses of the amplifying and reshaping apparatus should correspond in spacing exactly to those of the distorted input pulses in order to accurately preserve the intelligence carried thereby. In recovering coded signals from magnetic tapes, for example, preservation of this phase relationship is of utmost importance if accurate, high speed operation is to be obtained.

Accordingly, it is the principal object of this invention to provide apparatus for amplifying and shaping signals while accurately preserving the phase relationships thereof.

It is a further object of this invention to provide a novel circuit for linearly amplifying signals below a predetermined level and limiting signals above that level.

Another object of this invention is to provide an amplifier generating both in phase and out of phase outputs in response to either single or two phase inputs.

A further object of this invention is to provide such an amplifying and shaping circuit utilizing semiconductors, wherein criticality in choice of components is minimized.

Briefly, the basic circuit of this invention comprises a pair of similar current paths connected in common to a constant current source and having a current controlling and amplifying device in each path. With no signal present, the current from the source divides evenly between the two paths. Application of an input signal to the current controlling device in one of the paths increases or decreases the current flow therein in accordance with the phase and amplitude of the input signal. An increase in current in one path causes a complementary decrease of current in the other path. At a predetermined level of input signal, all of the available current will be switched to one of the paths, thereby providing a limiting action. Signals below the predetermined level are amplified linearly. Complementary outputs are available at load resistors in each of the paths and stages may be cascaded as desired.

The foregoing and other objects, features and advantages of the invention will be apparent from the following more particular description of preferred embodiments of the invention, as illustrated in the accompanying drawings.

Figure 1:
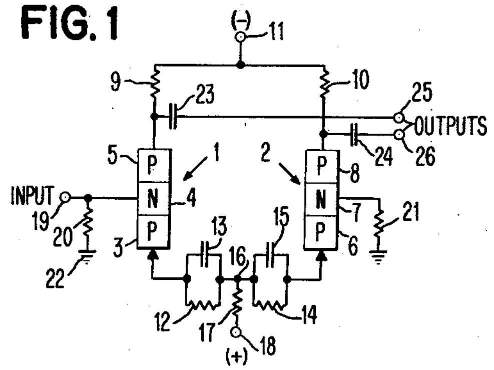
FIG. 1 is a schematic diagram of one embodiment of the basic circuit of the invention.

Referring to FIG. 1, semiconductor elements 1 and 2 are illustrated as transistors of the PNP junction type, although any suitable type of transistor may be used. Transistor 1 has emitter 3, base 4 and collector 5, and the similar elements of transistor 2 are shown at 6, 7 and 8 respectively. Collectors 5 and 8 are coupled through resistors 9 and 10 respectively to the negative terminal of a source of potential 11. Emitter 3 of transistor 1 is coupled to one side of the parallel combination of resistor 12 and capacitor 13, the other side of which is connected to junction point 16. Emitter 6 of transistor 2 is similarly coupled through the parallel combination of resistor 14 and capacitor 15 to junction point 16. Large resistor 17 and positive voltage source 18 constitute a constant current source connected to the junction point 16. Input signals are supplied to base 4 from terminal 19 and resistors 20 and 21 couple bases 4 and 7 respectively to reference potential 22. Outputs are taken from collectors 5 and 8, through capacitors 23 and 24, to output terminals 25 and 26 respectively.

With no signal at input terminal 19, both transistors 1 and 2 have their base-emitter junctions forward biassed by the source 18; bases 4 and 7 being returned to reference potential. The transistors are therefore conducting and the constant current source comprised of resistance 17 and voltage source 18 has its output divided between two conductive paths, each including a transistor. The amount of current flowing in each path will depend on the ratio of impedances therein, with the total of the two currents being equal to that supplied by the source.

As will be seen hereinafter, it is necessary that the current flow in the two paths be equal in the absence of an input signal. It can be seen that if the two transistors used were of identical internal impedance, this equal current division might easily be realized. Such identity of characteristics is extremely difficult to achieve however, and consequently, the cost of a matched pair of transistors would be prohibitive. Accordingly, the parallel resistor-capacitor combination in each emitter lead is provided to effectively equalize the D.C. impedance in the two paths regardless of mismatch of transistor impedance characteristics. To accomplish this, resistors 12 and 14 are made equal to each other and very large compared to the relatively low internal impedances of the transistors. The effect of the transistors on the total series impedance of the individual paths is therefore relatively negligible and substantially equal current flow is maintained therein. The capacitors 13 and 15 provide low impedance bypass paths for signal frequencies. Thus, the necessity for carefully selected and matched transistors is eliminated, and ordinary stock elements may be used with the resultant savings in cost.

Figure 3:
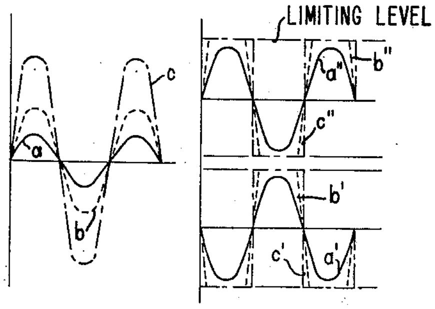
FIG. 3 is a waveform diagram illustrating the operation of the circuits of FIGS. 1 and 2.

Operation of the circuit may best be understood by referring to the waveforms illustrated in FIG. 3. The circuit operation will be expalined in conjunction with a sinusoidal input, although as will be seen hereinbelow in connection with FIGS. 4 and 5, the mode of operation will be the same for any shape of input signal. In FIG. 3, curves *a*, *b* and *c* represent input signals of three different amplitudes which would be applied at terminal 19. The curves *a'*, *b'*, *c'* and *a''*, *b''*, *c''*, illustrate the outputs available at terminals 25 and 26 respectively, in response to the inputs *a*, *b* and *c*. As an input signal is applied to the base 4 of transistor 1, the potential of the base with respect to emitter 3 varies in accordance with the voltage fluctuations of the input signal. This causes a similar variation in the conductivity (or inversely, the impedance) of the transistor 1 and the impedances of the two current paths become unbalanced. The constant current available at junction 16 will then divide between the two paths inversely as their impedance ratio. Accordingly, a positive going input applied to base 4 will increase the effective impedance of transistor 1 with the result that more current will flow through transistor 2 than through transistor 1. Since the collector potentials of the transistors will rise in a positive sense in proportion to the amount of current flowing through the transistors and the respective resistors 9 and 10, it will be seen that with a positive voltage swing at the input, collector 8 will rise in potential while collector 5 will go more negative. Transistor 2, then, provides an output in phase with the input at terminal 26 while transistor 1 provides an out of phase or reciprocal output at terminal 25. Capacitors 23 and 24 are coupling capacitors to eliminate D.C. components from the outputs. This action can be clearly seen with respect to the solid line curves *a*, *a'* and *a''* of FIG. 3. As shown therein, both in phase and out of phase outputs are derived. Since each of the transistors is connected in a common emitter amplifier configuration, linear amplification of the input signal is achieved.

At a certain magnitude of input signal, determined by choice of circuit parameters such as voltage source 18 and resistor 17, and thus variable, all of the current available at junction 16 will flow through one of the transistors and the other transistor will be non-conducting. This is the limiting condition and is shown by curves *b*, *b'* and *b''* of FIG. 3 where the sine wave input is made sufficiently large to cause limiting during a portion of each half cycle. As the input signal at base 4 rises, less and less current flows through transistor 1, occasioning a complementary increase in the current flow through transistor 2. At some fixed level of input potential, transistor 1 is rendered entirely non-conductive and all the available current flows through transistor 2. Since a fixed amount of current is available at junction 16 from the constant current source, the collector potential of transistor 2 will remain constant during its period of maximum conduction, producing the flat topped output voltage waveform shown. As the input starts to fall, transistor 1 again becomes conductive and division of current between the two transistors resumes, finally reaching the point where all of the available current flows in transistor 1 and transistor 2 is cut off. The squared off waveforms resulting are shown by the curves *b'* and *b''*. As the input signal increases in amplitude, the slope of the sides of the output signals increases until, as shown by curves *c*, *c'* and *c''*, the outputs are substantially square waves.

As will be apparent from operation of the circuit, in order to maintain the outputs truly complementary, i.e., equal in amplitude and 180° out of phase, it is necessary that the reference levels about which the two outputs vary be the same. Also, since capacity coupling between cascaded stages is most desirable, it is necessary that these reference levels be identical so that no D.C. component is introduced into a signal which would tend to introduce a recovery transient at its termination. It is to keep the reference levels the same that equal current flow in the two paths is maintained in the absence of an input signal.

Figure 2:
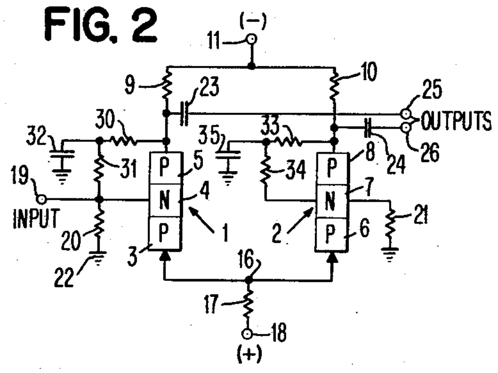
FIG. 2 is a schematic diagram of another embodiment of the basic circuit of the invention.

FIG. 2 illustrates a modification of the basic circuit of FIG. 1 and similar parts thereof have the same reference numerals. As seen from the drawing, the circuit of FIG. 2 has a feedback path comprising resistors 30 and 31 serially connected between the collector 5 and base 4 of transistor 1, with a capacitor 32 connected between the junction of resistors 30 and 31 and reference potential. A similar network comprising resistors 33 and 34 and capacitor 35 is coupled between collector 8 and base 7 of transistor 2. The emitters 3 and 6 are connected directly to the junction 16, the parallel RC networks of FIG. 1 being eliminated.

As is evident from the connection of the resistors 30, 31 and 33, 34, these elements provide degenerative feedback, or degeneration, for each of the transistors. This will tend to cancel D.C. current drift in the circuit path comprising the transistor and thereby stabilize D.C. current flow therethrough. If the feedback resistances of both transistors are of equal value, the D.C. currents through the two transistors will be maintained substantially equal in the absence of an input signal. The capacitors 32 and 34 are bypass elements to prevent A.C. degeneration. This degenerative feedback then serves the same function as the parallel RC networks in the emitter leads of FIG. 1, the emitters being directly connected to provide a low impedance path for signal frequencies, and the rest of both circuits is identical. The discussion relative to the operation of FIG. 1, and the waveforms of FIG. 3, are equally applicable to the circuit of FIG. 2 and reference may be had thereto for a description of the operation of the circuit.

Figure 4:
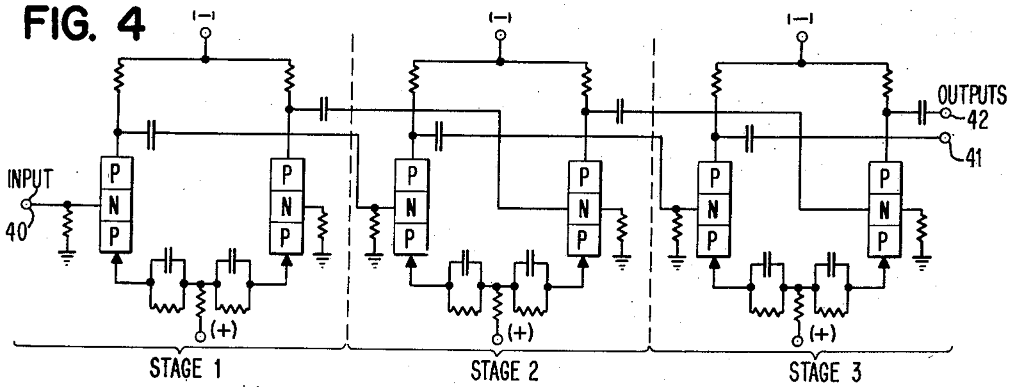
FIG. 4 is a schematic diagram of a multistage amplifier according to the invention.

In FIG. 4 is shown a multistage amplifier according to the invention comprising three cascaded stages. Each of the stages is identical to that shown in FIG. 1, althought the embodiment of FIG. 2 may be used as well, or they may be intermixed, if desired. Likewise, three stages are shown merely as an example, any number of stages being capable of connection in cascade in accordance with the individual application.

Figure 5:
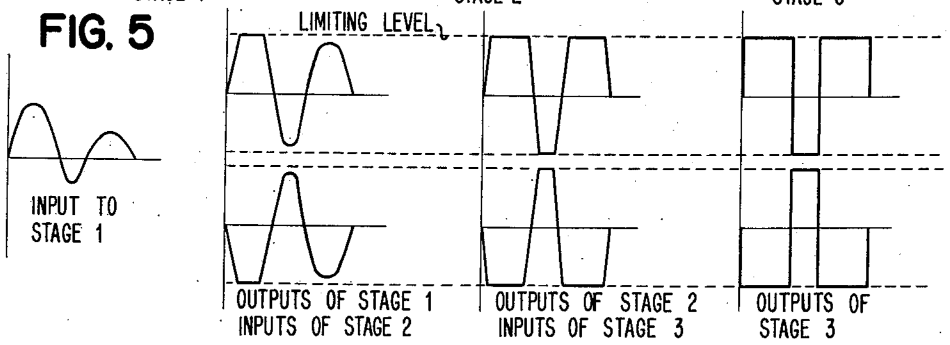
FIG. 5 is a waveform diagram illustrating the operation of the circuit of FIG. 4.

Reference may be had to the waveforms of FIG. 5 for an explanation of the operation of the multistage circuit. Assuming an input having the shape shown in FIG. 5, which may be a signal read from a magnetic tape, the outputs of stage 1 will be a pair of amplified replicas thereof having one peak limited as shown. These two outputs are coupled to the two transistors, respectively, of the following stage 2.

It will be noted here, that both transistors of stage 2 (and all succeeding stages) are driven by input signals, whereas only one input is provided to the first stage. This arrangement is used to enhance the amplification of each stage by forcibly driving the base of each transistor, rather than merely allowing one transistor to inversely follow the changes of the other. This substantially doubles the gain of the dual input stage with respect to the single input stage. If available, complementary inputs may similarly be applied to stage 1. A single input has been shown since in practice, complementary signals will usually not be present. Of course, a phase inversion stage may be employed to provide the dual inputs if desired.

The output signals of stage 1 are applied as the inputs to the second stage. With these signals providing the respective inputs of stage 2, the transistors of that stage are driven to the limiting condition during a portion of each cycle, and the flat topped output waveforms result. These squared off signals are then applied as the inputs to stage 3 and the amplification and limiting of that stage will serve to increase the slope of the sides of the waveform while maintaining the same limiting level, thereby producing substantially rectangular complementary outputs at output terminals 41, 42. Each succeeding stage that may be present would serve merely to further steepen the slopes of the sides of the wave and the steepness of slope desired would dictate the number of stages necessary. This same operation would occur regardless of the shape or amplitude of the input signal, it being apparent that if the amplitude swing of the input signal were large enough, complete limiting could occur in the first stage, as shown in curves *c*, *c'* and *c''* of FIG. 3.

The advantages inherent in the above described circuits, either single or multiple stages, make this configuration extremely useful in the handling of small signals. The biasing potentials used keep the transistors out of saturation and consequently, very small base voltage variations result in relatively large variations in collector current. Moreover, because the transistors are never in saturation, minority carrier storage delays are eliminated, whereby switching between limiting and non-limiting conditions is rapid with resultant sharpness of the waveforms. Additionally, because of the complementary action of the amplifier, the relative phase displacement between consecutive input signals is maintained in the output. This is effected since any tendency of the reference level to climb or drop in one transistor is cancelled by the complementary effect in the other transistor. Thus pulse spacing may be accurately maintained, enabling reliable transmission of intelligence. Also, as is evident particularly from consideration of the multistage amplifier, this configuration enables an extremely wide amplitude range of signals to be accepted. It may be noted that in addition to its function as a single amplifier and shaper, a single stage may also function as an effective square wave generator or electronic switch when driven by a large amplitude sine wave input, as shown in FIG. 3 (curve *c*).

Although PNP junction type transistors are shown for purposes of example, it will be evident that any type of transistor may be used, with suitable changes in biassing potentials.

While the invention has been particularly shown and described with reference to preferred embodiments thereof, it will be understood by those skilled in the art that various changes in form and details may be made therein without departing from the spirit and scope of the invention.

What is claimed is:

1. An amplifier for reconstructing an alternating current input signal so as to provide amplitude limited complementary alternating current output signals in phase at a reference axis with said input signal, comprising in combination a substantially constant unidirectional current source, a reference potential, first and second signal amplifying current paths coupling said source and said potential, each of said paths including a transistor consisting of emitter, base and collector electrodes, said current source having a predetermined magnitude below the saturation current value of said transistors to negate any phase delays inherent in the saturable operation of said transistors, means coupling the emitter electrodes of said transistors to said source and presenting a low impedance to alternating currents between said emitter electrodes, first and second equivalent means biasing the base electrodes of each of said transistors enabling conduction to occur in the absence of said input signal, each of said paths also including impedance means in circuit with each of said transistors for rendering said paths including said transistors of substantially equal impedance in the absence of said input signal, whereby the unidirectional current flow from said source is equally divided through each of said paths, said impedance means comprising an equivalent resistive-capacitive network, means coupling said input signal to the base electrode of one of said transistors, the base electrode of the other of said transistors being connected to one of said biasing means, so that as the amplitude of said input signal varies with respect to said reference axis, the current flow through said paths varies in the unsaturated operating region of said transistors between zero and said predetermined magnitude, producing equal and opposite current flow division through said paths, said current flow being in phase at said reference axis with said input signal, and means for deriving said complementary outputs from the collector electrodes of said transistors, the amplitude of said output signals being limited in accordance with the magnitude of said source.

2. The amplifier of claim 1, wherein each of said resistive-capacitive networks is in a parallel circuit arrangement connected in a path between said source and said emitter electrode enabling the capacitive portion of said network to act as a low impedance path for alternating currents and the resistive portion of said network to provide a high impedance path for direct currents, so that circuit stability takes place in the absence of an input signal.

3. The amplifier of claim 1, wherein each of said resistive-capactive networks is arranged as a degenerative feedback circuit between the collector and base electrodes of a respective transistor enabling the capacitive portion of said networks to act as bypass elements preventing alternating current degeneration and the resistive portion of said networks to negate any direct current drift in said paths.

4. A multistage amplifier for reconstructing by steps an alternating current input signal so as to provide amplitude limited complementary alternating current output signals in phase at a reference axis with said input signal, said amplifier comprising a plurality of stages, each of which includes a substantially constant unidirectional current source, a reference potential, first and second signal amplifying current paths coupling said source and said potential, each of said paths including a transistor consisting of emitter, base and collector electrodes, said current source having a predetermined magnitude below the saturation current value of said transistors to negate any phase delays inherent in the saturable operation of said transistors, means coupling the emitter electrodes of said transistors to said source and presenting a low impedance to alternating currents between said emitter electrodes, first and second equivalent means biasing the base electrodes of each of said transistors enabling conduction to occur in the absence of said input signal, each of said paths also including impedance means in circuit with each of said transistors for rendering said paths including said transistors of substantially equal impedance in the absence of said input signal, whereby the unidirectional current flow from said source is equally divided through each of said paths, said impedance means comprising an equivalent resistive-capacitive network; means coupling said input signal to the base electrode of one of said transistors of the first stage, the base electrode of the other of said transistors of said first stage being connected to a biasing means; means for deriving said complementary outputs from the collector electrodes of said transistors of each stage; and means for coupling the complementary outputs of each stage respectively as input signals to the base electrodes of the transistors of the first and second conducting paths of the succeeding stage, so that, as the amplitude of said input signal varies with respect to said reference axis, the current flow through said paths of each stage varies in the unsaturated operating region of said transistors between zero and said predetermined magnitude producing equal and opposite current flow division through the paths of each stage, said current flow being in phase at said reference axis with said input signal, whereby as each of said stages amplifies said input signal, said complementary output signals are reconstructed by steps to be amplitude limited and in phase at said reference axis with said input signal.

References Cited in the file of this patent

UNITED STATES PATENTS

| | | |
|---|---|---|
| 2,388,544 | Holst et al. | Nov. 6, 1945 |
| 2,663,766 | Meacham | Dec. 22, 1953 |
| 2,691,075 | Schwartz | Oct. 5, 1954 |
| 2,750,456 | Waldhaver | June 12, 1956 |
| 2,762,870 | Sziklai | Sept. 11, 1956 |
| 2,791,664 | Sziklai | May 7, 1957 |
| 2,832,051 | Raisbeck | Apr. 22, 1958 |
| 2,866,892 | Barton | Dec. 30, 1958 |
| 2,928,011 | Campbell | Mar. 8, 1960 |

OTHER REFERENCES

Slaughter: Transactions of the IRE Circuit Theory, March 1956, pages 51–53.